United States Patent [19]
Venthem et al.

[11] Patent Number: 5,333,005
[45] Date of Patent: Jul. 26, 1994

[54] APPARATUS FOR RAISING AND LOWERING PLOTTER MARKING DEVICES

[75] Inventors: John C. Venthem, Georgetown; James A. Parnell, Austin, both of Tex.

[73] Assignee: Summagraphics Corporation, Seymour, Conn.

[21] Appl. No.: 728,096

[22] Filed: Jul. 10, 1991

[51] Int. Cl.$^5$ .............................................. G01D 5/02
[52] U.S. Cl. .................. 346/139 B; 346/141
[58] Field of Search .............. 346/29, 139 R, 139 B, 346/141

[56] References Cited

U.S. PATENT DOCUMENTS

| | | | |
|---|---|---|---|
| 3,396,402 | 8/1968 | De May, II | 346/139 B X |
| 4,560,996 | 12/1985 | Aratsu | 346/139 R |
| 4,734,716 | 3/1988 | Silverberg | 346/136 |
| 4,853,715 | 8/1989 | Paschkis | 346/139 R |

Primary Examiner—Joseph W. Hartary
Attorney, Agent, or Firm—Rosen, Dainow & Jacobs

[57] ABSTRACT

Apparatus especially X-Y plotters having a marking device for marking a surface. A support is provided for supporting the marking device. The support is movable along an axis of the housing while the marking device can be selectively raised and lowered relative to the surface. The raising and lowering is carried out by means of a flexible driving element, for example, a cable, connected to a pivotable link on the support and activated by a motor. The marking device support is freely translatable relative to the flexible driving element.

14 Claims, 4 Drawing Sheets

APPARATUS FOR RAISING AND LOWERING PLOTTER MARKING DEVICES

FIELD OF THE INVENTION

The present invention relates to apparatus for raising and lowering marking devices, and, more particularly, to a mechanism for raising and lowering marking devices in plotter instruments used in conjunction with computers.

BACKGROUND OF THE INVENTION

Plotters and similar graphics equipment frequently utilize, pencils, pens and similar marking devices to develop a plot, graph or similar graphics. Typically, in an XY plotter, the paper, chart or other medium to be marked is moved back and forth through the plotter along the X-axis, and a carriage is moved perpendicular to the feed of the medium along the Y-axis. The carriage typically is adapted to receive a pen or similar marking device, and functions to move the pen back and forth along the Y-axis and to raise and lower the pen in order to develop the graphics picture in conjunction with movement of the paper along the X-axis.

Apparatus in plotters used to raise and lower marking devices should be simple in design in order to simplify repair and replacement of components. In addition, such apparatus should have low mass to allow rapid marker movement with little application of power. In general, apparatus used today to raise and lower marking devices is complex and constructed with many components. These components include synchronous belts, pulleys, and cams typically extending over the entire Y-axis of pen travel. It is difficult to repair such apparatus because this type of construction prevents easy access and removal of individual components. Furthermore, due to the high inertia of these components, they move comparatively slowly and require significant power to operate them. In addition, these parts are extremely noisy.

SUMMARY OF THE INVENTION

An object of the present invention is apparatus, for raising and lowering a marking device, having little mass.

Another object of the present invention is to provide an apparatus, for raising and lowering marking devices, which is easy to repair and replace components.

The above and other objects and advantages of the present invention are obtained in apparatus, for use in digital plotters, which employs a cable-operated mechanism for raising and lowering its marking device.

In accordance with an aspect of the present invention, the apparatus comprises a housing, marking means for marking a surface, and a support means for supporting the marking means. The apparatus also comprises means for positioning the support means along a first generally laterally extending axis of the housing and means for selectively raising and lowering the marking means. The raising and lowering means comprises a flexible driving element coupled to the support means and means for activating the flexible driving element to raise and lower the marking means while allowing the support means to freely translate relative to the flexible driver in response to the positioning means.

In a preferred embodiment, the flexible driving element is a cable of a material which is lightweight, strong, and exhibits little stretch, and that spans the motion range of the support means and that is activated by a motor mounted on the plotter housing. The cable is coupled to the marker support means by way of idler pulleys and is maintained under tension to assure response to the movements of the motor.

The above and other objects, aspects, features and advantages of the invention will be more readily perceived from the description of the preferred embodiments thereof taken in conjunction with the accompanying drawings and appended claims.

BRIEF DESCRIPTION OF THE DRAWINGS

FIG. 7 is a plan view of an alternative embodiment of the tension adjusting assembly of an instrument according to the invention;

FIG. 8 is a plan view of an alternative embodiment of the activating assembly for an instrument according to the invention.

DETAILED DESCRIPTION OF THE PREFERRED EMBODIMENTS

Figure 1:
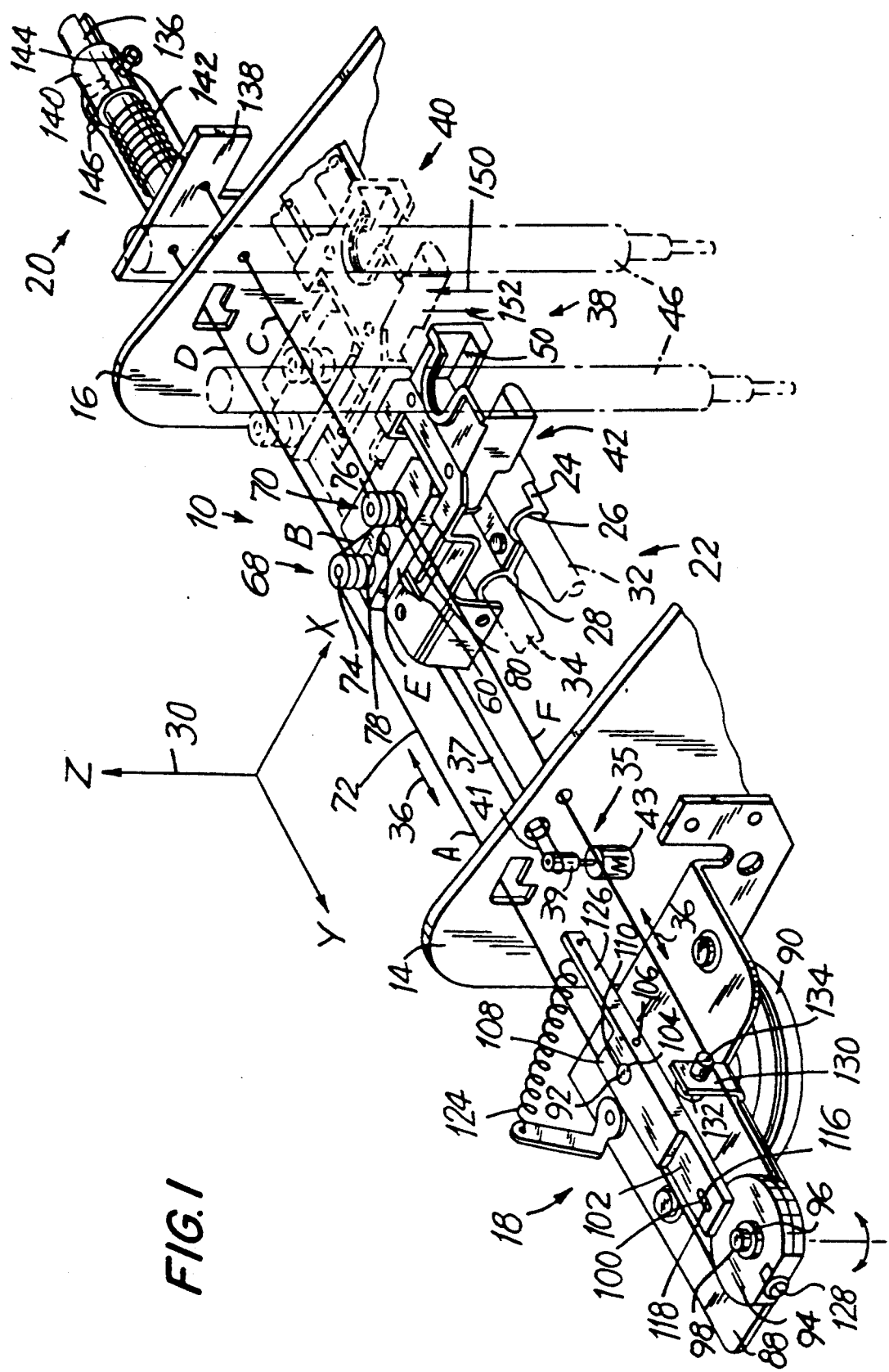
FIG. 1 is a perspective view of part of a plotter instrument incorporating one form of cable-operated mechanism for raising and lowering marking instruments according to the present invention.

Referring to FIG. 1, a plotter instrument 10 incorporating one form of cable-operated mechanism used to raise and lower marking instruments in accordance with the present invention is shown. The plotter 10 is typically supported in a horizontal plane, and includes a housing, a frame which is part of the housing, and a surface support structure (not shown) for supporting a plotting medium such a paper. The frame contains a left plate 14 and a right plate 16 mounted vertically with respect to the horizontal plane in which the plotter 10 is arranged.

The plotter 10 contains at the left of FIG. 1 an activating assembly 18 for raising and lowering a marking device, such as a pen. The plotter 10 also contains a tension maintaining assembly 20 shown on the right, and a moving carriage assembly 22 located just above the media and between the activating assembly 18 and the tension maintaining assembly 20.

The moving carriage assembly 22 contains a carriage unit 24 having two parallel linear bores 26,28 extending across the carriage unit 24 along the Y-axis. (See the XYZ coordinates 30 in FIG. 1 for reference). These linear bores 26,28 extend entirely through the carriage unit 24, and are engaged by two shafts 32, 34 (shown in dashed lines) mounted at opposite ends of the frame. The carriage unit 24 is supported by and rides along the shafts 32,34 and allows the carriage unit 24 and hence the moving carriage assembly 22 to move, freely, transversely across the plotter 10 along the Y-axis as shown by arrow 36. The moving carriage assembly 22 is shown in a first position 38 in solid lines, and in a second position 40 in dashed lines. The moving carriage assembly 22 is moved across the plotter 10 by a positioning element 35 under control of computer commands. This positioning element 35 typically comprises a drive belt 37 driven by a pulley 39 on a shaft 41 of a motor 43 mounted on the frame. See U.S. Pat. No. 4,734,716 for more details of this conventional drive. This positioning element 35 is well known in the art and need not be further discussed herein.

Figure 4:
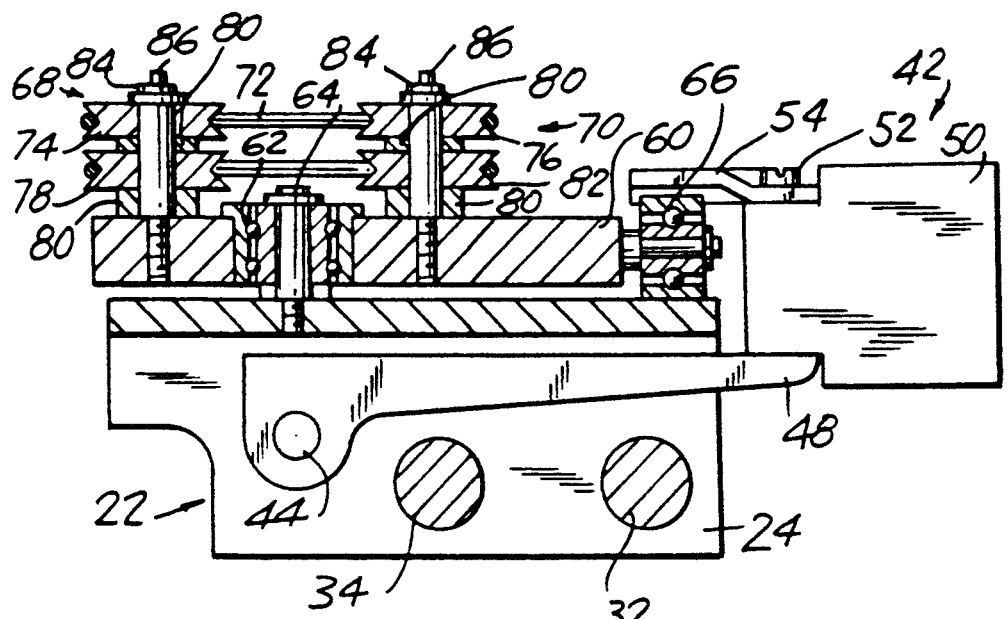
FIG. 4 is a side cross-section view of the pen support assembly of the instrument illustrated in FIG. 1.

As shown in FIG. 1 and more clearly in FIG. 4, the plotter 10 also contains a support assembly 42 pivotally attached to the rear of the carriage unit 24, next to the rear openings on the sides of the carriage unit 24, by a pen lift pivot 44. The support assembly 42 supports a pen 46 (shown in phantom in FIG. 1) in a pen holder 50. The support assembly 42 is attached in this manner to permit it to arcuately move with respect to the carriage unit 24 in a vertical plane toward and away from the media.

The support assembly 42 includes a pen support member 48 (FIG. 4) for a pen lift tray 48, and a pen 46 secured in the pen holder 50. The pen holder 50 extends beyond the front of the carriage unit 24 in order to permit the pen 46 inserted in the pen holder 50 to reach the media below. The support assembly 42 also contains a camming structure in the form of a cam plate 54 that is attached to the top of the pen holder 50 by a screw 52. The cam plate 54 extends away from the front of the pen holder 50 and over the front end of the carriage unit 24.

Figure 5A:
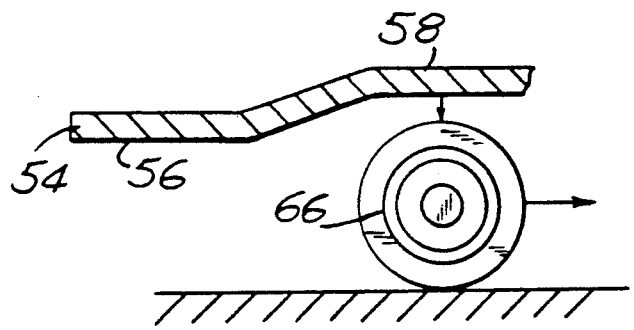
FIGS. 5A and 5B are cross-sectional views of the cam wheel and cam plate arrangement when the pen is in its lowered and raised positions, respectively.
Figure 5B:
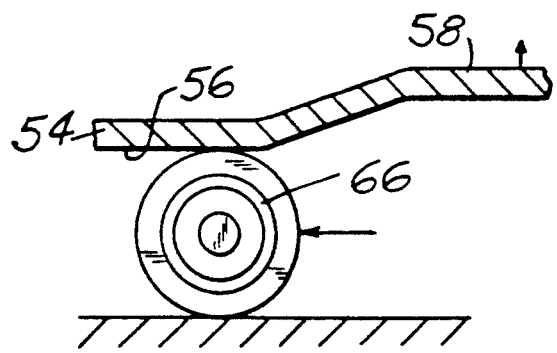

As seen in FIGS. 5A and 5B, the cam plate 54 contains a first level 56 and a second level 58. The first level 56 is associated with the pen in its lowered position (FIG. 5A). The second level 58 is associated with the pen support member 48 (and hence the pen) in its raised position off of the media (FIG. 5B). This will be discussed in further detail below.

As previously stated, the mechanism for raising and lowering the pen contains an activating assembly 18 (FIG. 1). The raising and lowering mechanism also comprises a pivotal arm 60 pivotally attached to the top of the carriage unit 24 by a ball bearing arrangement 62 contained in the pivotal link 60 and bearing shaft 64 as shown in FIG. 4. The bearing shaft 64 is inserted through the bearing arrangement 62 and the pivotal link 60. In this configuration, the pivotal link 60 is permitted to freely arcuately pivot horizontally with respect to the carriage unit 24. In addition, the raising and lowering assembly includes a roller 66 (FIG. 5) attached to the front of the pivotal link 60. The roller 66 arcuately moves or rolls on the carriage unit 24 in a horizontal plane in response to the movement of the pivotal link 60. The cam plate 54 rests on the roller 66. When the pivotal link 60 is caused to pivot, the 66 rolls on the top surface of the carriage unit 24 and simultaneously against the bottom of cam plate 54 from the first level 56 to the second level 58, and vice versa. As a result, the pen support member 44 is lowered and raised.

The cam 54 can be made of many materials, but is preferably made of Delrin AF. Since Delrin AF is self lubricating, wear in the cam 54 is minimized as well as noise and pen bounce. In the preferred embodiment, a ball bearing arrangement 62 is located in the center of the pivotal link 60. This provides an even balance of the pivotal link. The pivotal link 60 is designed to be rectangular with a length that is substantially the same as the width of carriage unit 24.

The raising and lowering assembly also comprises first and second idler pulley structures 68,70 axially vertically disposed on the pivotal link 60. The first pulley structure 68 is secured to the pivotal link 60 at the rear thereof. The second pulley structure is secured to the pivotal link 60 on the other side of the ball bearing arrangement 62. The raising and lowering assembly also comprises a flexible driver in the form of a cable 72. The cable 72 is secured to the activating assembly 18 (FIG. 1) and extends through the left frame plate 14 to the first and second pulley structures 68, 70. The cable 72 is attached to the first and second pulley structures 68,70 and then extends to and through the right frame plate 16 and is attached to the tension maintaining assembly 20. The specific connections of the cable 72 will be discussed in greater detail below.

As seen in FIG. 4, the first and second pulley structures 68,70 comprise upper pulleys 74,76, lower pulleys 78,82 and a plurality of spacers 80, respectively. These spacers 80 are placed between the pivotal link 60 and lower pulleys 78,82, between the upper pulleys 74,76 and lower pulleys 78,82, and between the upper pulleys 74,76 and the mechanism securing the pulley structures 68,70 to the pivotal link 60, respectfully. The mechanism securing the pulley structures 68,70 to the carriage unit 24 consists of snap rings 84 placed directly on the top of the upper spacers 80 and spindles 86 passing through the pulley structures 68,70 and retained in the pen carriage 24. This design permits free rotation of the individual pulleys 74,76,78,82.

Figure 3:
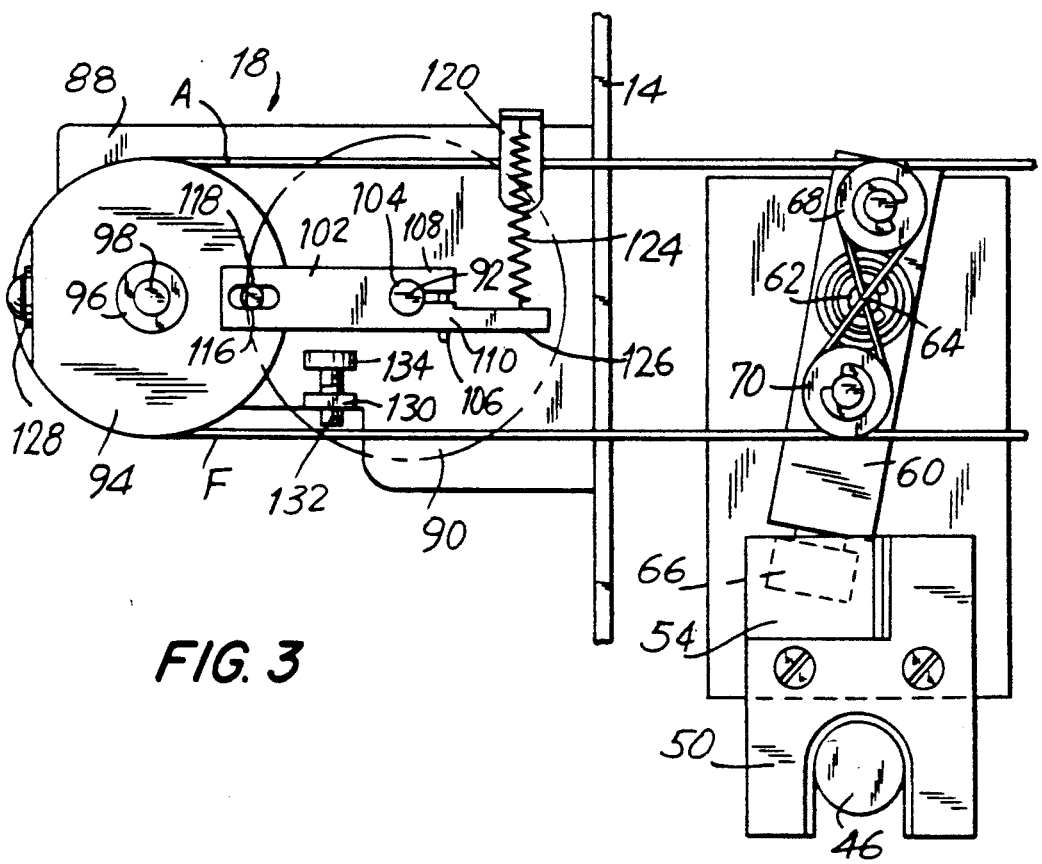
FIG. 3 is a plan view of the activating assembly and pen support assembly of the instrument illustrated in FIG. 1.

As shown in FIG. 1, and more clearly illustrated in FIG. 3, the activating assembly 18 comprises a mounting plate 88 secured to the frame of the plotter 10 and a stepper motor 90 secured to the bottom of the mounting plate 88 by a nut plate and a bolt (both nut plate and bolt not shown). The motor shaft 92 of the stepper motor 90 protrudes through the mounting plate 88. The activating assembly 18 further comprises a drive pulley 94 pivotally attached to the mounting plate 88 by a flanged ball bearing 96 and a screw 98 inserted through the ball bearing 96 on drive pulley 94 to permit the drive pulley 94 to rotate. The activating assembly 18 also has a pin 100 (FIG. 1 only) secured to the top edge of the drive pulley 94, perpendicularly to the surface of the drive pulley 94.

The activating assembly 18 further comprises a pulley lever 102 having at one end a first hole 104 extending via a short slot to the edge defining two short parallel portions 108,110 between which motor shaft 92 is clamped to the lever 102 by a clamp screw 106.

The pulley lever 102 also has at its other end a second elongated hole above the drive pulley 94 and having two short parallel wall portions 116,118 whose spacing is essentially the same as the diameter of the pin 100 inserted therethrough. The pin 100 engages the second elongated hole with little clearance yet allowing the pin pivot 100 to move the length of the second elongated hole between the walls 116, 118. This allows the drive pulley 94 to rotate in either direction a small amount. When the stepper motor 90 is activated, the motor shaft 92 rotates which causes pulley lever 102 also to rotate. As a result, the drive pulley 94 also rotates due to the force exerted on the pin pivot 100 by the pulley lever elongated hole surfaces 116 or 118, depending upon the direction of rotation.

The activating assembly 18 also comprises an L-shaped solder lug 120 (FIG. 3) mounted perpendicularly to the mounting plate 88, and a return spring 124 having one end hooked to the top of the lug 120. The pulley lever 102 also has an extension 126 extending from one parallel portion 108 of the pulley lever 102. The end of the extension 126 is connected to the other end of the return spring 124. The function of the return spring 124 will be discussed below. When the pulley lever 102 is in its resting position, it is located essentially along the Y-axis, perpendicular to the left frame plate 14.

The drive pulley 94 contains a cable clamp 128 secured to the center of its circumference. The cable 72 is secured by the cable clamp 128 to and surrounds the outer half of drive pulley 94, and extends toward the left frame plate 14.

The mounting plate 88 contains a L-shaped portion 130 located adjacent to the pulley lever 102 on the opposite side of the L-shaped lug 120. This L-shaped portion 130 contains a clinch nut 132 secured thereto and a set screw 134. The set screw is adjusted such that the travel of pulley lever 102 is optimized.

Figure 6:
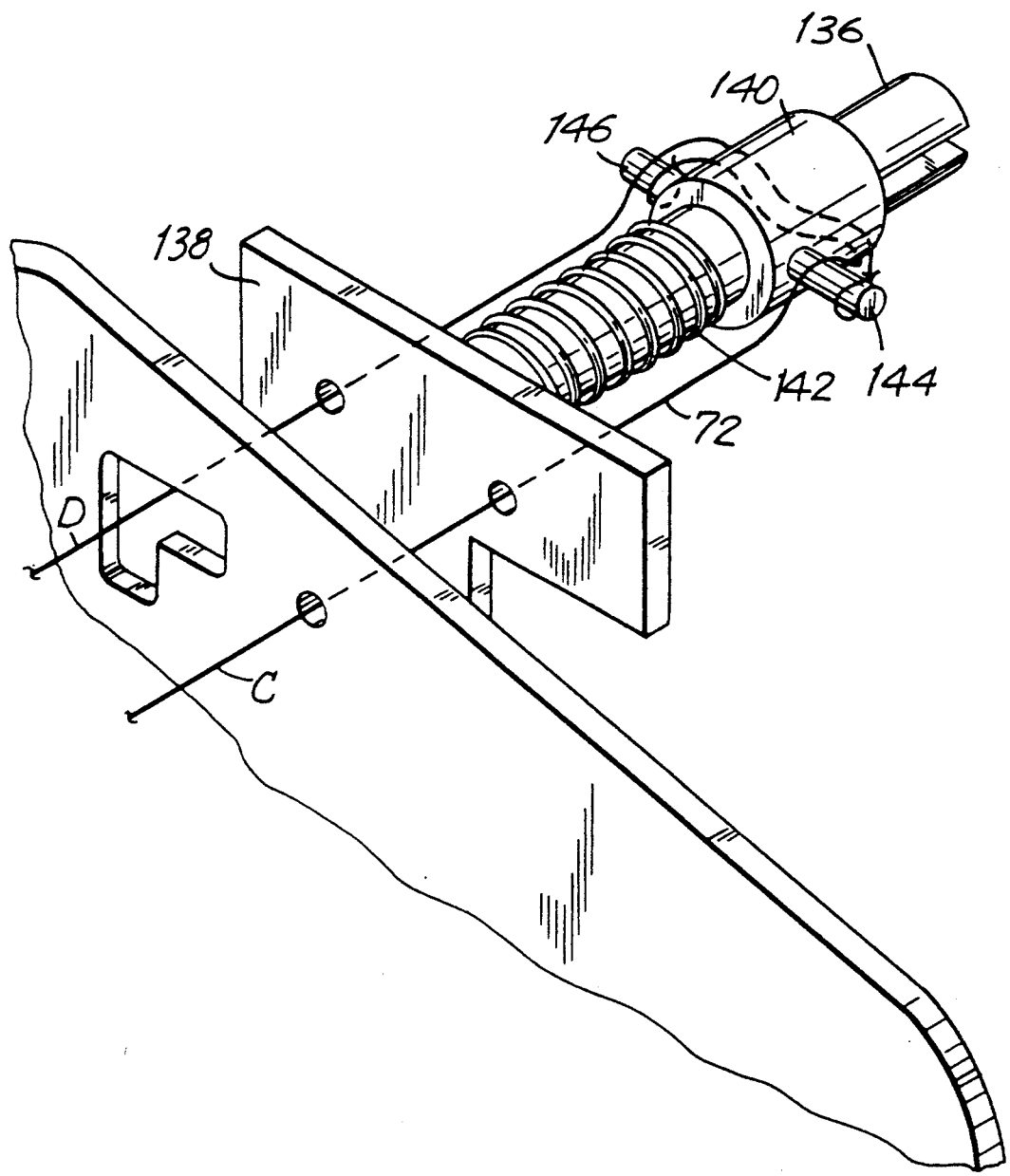
FIG. 6 is an enlarged perspective view of the cable tension maintaining assembly of the instrument illustrated in FIG. 1.

Referring to FIG. 1, and as more clearly seen in FIG. 6, the tension maintaining assembly 20 comprises a rod 136 located along the Y-axis and a rectangular plate 138 attached to the rod 136 and the frame of the plotter 10. The rectangular plate 138 is located in the XZ plane and is parallel to the right frame plate 16. The tension maintaining assembly 20 further contains a cylinder 140 loosely slidably mounted around the rod 136 and a compression spring 142 mounted around the rod 136 between the rectangular plate 138 and the cylinder 140. The cylinder 140 contains a first 144 and a second 146 spaced roll pin, both mounted perpendicularly to the surface of the cylinder 140, so that it appears that the two pin rolls 144,146 are one rod piercing through the cylinder 140 and rod 136. The roll pins 144, 146 are parallel to the rectangular plate 138. The first roll pin 144 points toward the front of the housing unit, and the second pin roll 146 points toward the back of the housing unit.

The cable 72 passes through the rectangular plate 138 to the respective pins 144,146. The cable 72 extends along the outside of the tension spring 142 and cylinder 140 to connect as shown in FIG. 6 to the respective roll pins 144,146. Because of the compression spring 142, the cylinder 140 slides along the rod 136 to apply and maintain tension on the cable 72.

Referring to FIG. 1, starting at the activating assembly 18, the cable 72 has its center point secured to the drive pulley 94 by the clamp screw 128. The cable 72 has six portions. The first portion A extends from the clamp screw 128 through the left plate 14 to the outside of the upper pulley 74 of the first pulley structure 68 and back around the upper pulley 74. The second portion B extends from the first portion A back around the upper pulley 76 of the second pulley structure 70. The third portion C extends from the second portion B toward the first roll pin 144. The cable 72 is wrapped around the first pin roll 144 and extends across and under the cylinder 140 and is secured around the second pin roll 146. The second cable portion follows a similar, complementary course with a portion F extending from the clamp screw 128 to around the bottom pulley 80 of the second pulley structure 70, a portion E from the latter around the bottom pulley 78 of the first structure 68, and a portion D over the pin 146 and under the cylinder 140 and secured to pin 144. The first A, third C, fourth D and sixth F portions of the cable 72 are parallel. Looking at the apparatus from the top, the first A, second B and third C portions define a substantially "Z" configuration, and the fourth D, fifth E and sixth F portions define a substantially inverted "Z" configuration.

In operation, usually by command from a computer, the stepper motor 90 in response to a large step pulse causes the motor shaft 92 to rotate. The motor shaft 92 causes the pulley lever 102 to rotate clockwise (viewed on end of shaft 92). The pulley lever 102 simultaneously causes the drive pulley 94 to rotate counterclockwise a small amount by way of the force placed upon the pin' pivot 100. As the drive pulley 94 rotates, a differential force is placed upon the first A and sixth F cable 72 portions which move a short distance in opposite directions. Displacement of the tensioned cables on the pulleys of the structures 68, 70 cause the pivotal link 60 to rotate about bearing shaft 64 (FIG. 4). As a result, the roller 66, assuming it is in the position shown in FIG. 5B, rolls along the carriage unit 24 and simultaneously rolls against the bottom surface of the cam plate 54. That is, it rolls from a first level 56 to a second level 58 of the cam plate 54 (FIG. 5A). Thus, the pen support member 48 connected to the cam plate 54 pivots about the pen lift pivot 44 (FIG. 1) causing the pen 46 to lower toward and engage the media as shown by direction arrow 152 in FIG. 1 and as shown in FIG. 5A.

When the computer commands the plotter 10 to raise the pen 46, the stepper motor 90 receives a negative step pulse causing the drive pulley 94 to rotate clockwise, which places the opposite differential force on the cable 72 causing its reverse movement. This, in turn, causes pivotal link to rotate in the opposite direction causing roller 66 to roll to the left in FIG. 5B camming plate 54 and the pen 46 upward in the direction 150 in FIG. 1. When power to the plotter 10 is turned off, the return spring 124 causes the pulley lever 102 to pivot and return to its resting position against set screw 134 located in clinch nut 13. In its resting position, the pulley lever 102 is substantially perpendicular relative to the left plate 14. In this position, the pen 46 is raised because roller 66 is located against the first level 56 of the cam plate 54 as seen in FIG. 5A. Consequently, the pen 46 automatically returns to its raised position.

The operation is the same no matter where the pen carriage 22 is positioned by its drive 35. In other words, if the carriage 22 is moved along the Y axis, the pulleys 74, 76, 78, 80 freely rotate along the cable 72 which maintains its tensioned condition. The same operation obtains when the pen lift mechanism 18 is activated to raise or lower the pen while the pen carriage 22 is simultaneously driven along the Y axis. In other words, the two drive mechanisms 18, 35 operate independently of one another yet function to selectively move the pen 46 back and forth along the Y axis and simultaneously to selectively move the pen 46 up and down in the Z direction as required by the plot being drawn.

Figure 2:
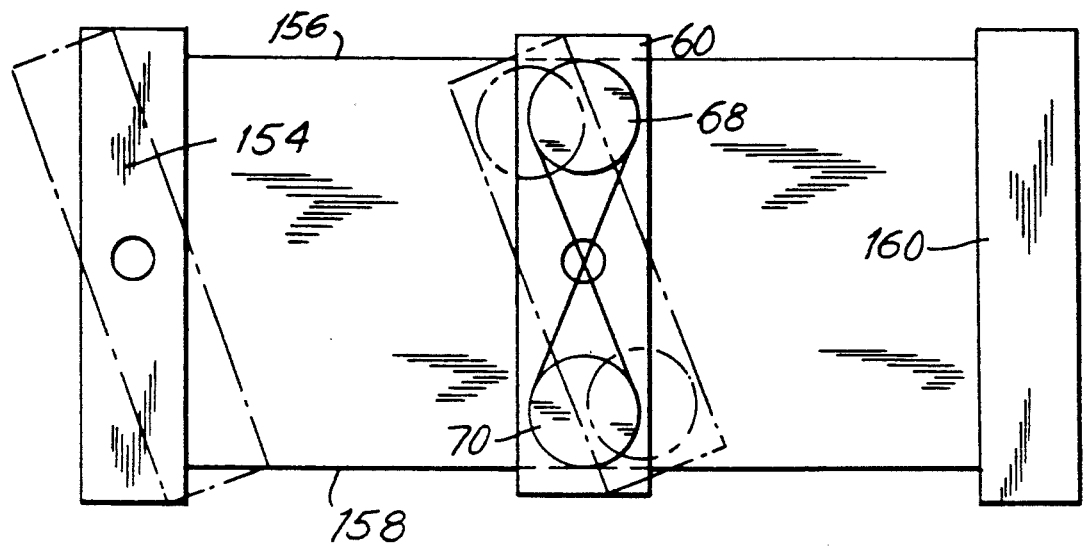
FIG. 2 is a plan view of an alternate embodiment according to the present invention.

Referring to FIG. 2, there is shown a simple, alternate embodiment of the present invention. In this embodiment, the same operation occurs i.e., a pivotal link 60 is caused to pivot and rotate except that a lever 154 is employed, instead of the drive pulley 94. Similarly, the lever 154 creates a differential force on and movement of the cable portions 156,158. In this embodiment, two cables 156,158 are used. While the cables 156, 158 are shown connected to a fixed brace 160 instead of the tension-maintaining assembly 20 shown in FIG. 1, the latter could be added if necessary.

Referring to FIG. 7, an alternative embodiment for the tension maintaining assembly 20 shown in FIG. 1 is illustrated. In this embodiment, a tension maintaining assembly 20' comprises a first bracket 162 mounted perpendicularly to the right plate 16 and a pivoting plate 164 secured to the first bracket 162 by a bolt 166. This tension maintaining assembly also comprises a tension pulley 168 secured to the pivoting plate 164 by a cap screw 170. The two ends of the cable 72 are secured to the tension pulley 168 by a cable clamp screw 172. In this arrangement, the pivoting plate 164 can be adjusted to create a greater or lesser tension in the cable 72 by securing the pivoting plate 164 and tension pulley 168 farther away from or closer to the right frame plate 16.

Referring to FIG. 8, an alternative embodiment of the activating assembly 18 shown in FIGS. 1 and 3 is illustrated. In all embodiments, the activating assembly 18 comprises a mounting plate 88 secured to the frame of the plotter 10, a stepper motor 90 mounted underneath the mounting plate 88 and a drive pulley 94 pivotally mounted to the mounting plate 88. In this embodiment, however, the activating assembly 18' comprises a crank lever 174. The crank lever 174 has a first hole at one end to fit the motor shaft 92 inserted therethrough. The crank shaft 174 is clamped to the motor shaft via a screw 178 similarly to that shown in the embodiment in FIG. 1 for the pulley lever 102. The crank lever 174 also contains a second hole to fit a first pin 182. A link 186 is pivotally mounted at one end of the crank lever 174 by the first pin 182, and is pivotally mounted at its other end to the drive pulley 94 by a second pin 184. While the link 186 can be made of any rigid material, it is preferably made of Delrin AF for its self-lubricating properties.

This activating assembly 18' also comprises a U-shaped stop member 188 secured at one end of the mounting plate 88 to restrict the crank lever 174 to rotate only a small distance in either direction. The activating assembly 18' also contains return spring 190 which functions similarly to the return spring 124 in the embodiment shown in FIGS. 1 and 3.

In the embodiment shown in FIG. 8, when the stepper motor 90 receives a positive pulse, the motor 90 causes the motor shaft 92 to rotate counterclockwise, and the crank lever 174 also rotates counterclockwise. The link 186 simultaneously pivots about the first pin 182 and causes the drive pulley 94 to also rotate counterclockwise by way of the second pin 184. As a result, a differential force is placed on the first A and sixth portions F of the cable 72 causing a small movement. This differential force causes movement of the pulley structures 68,70 causing the pivotal link 60 to rotate with respect to the carriage unit 24. Thus, the pen support member 48 and hence the pen 46 lowers toward the paper. By a further command from the computer, the stepper motor 90 receives a negative pulse and turns clockwise. The crank lever 174 also rotates clockwise and causes also drive pulley 94 to rotate clockwise. With this motion, the pen rises off of the media. When the plotter is turned off, the spring 190 causes the drives pulley 94 to return crank lever 174 to its resting position against the stop 188. This position is associated with the pen 46 in its raised position.

The tension in the cable 72 is not especially critical. However, the tension must be maintained high enough to prevent backlash in the system. Providing tension in the cable in the amount of about 1 pound is sufficient.

In addition, in the preferred embodiment, the diameter of the drive pulley 94 is the same as the distance from the outer surfaces of the first and second pulley structures 68,70. Therefore, there is no need for any additional pulleys to guide the cable.

The cable is preferably made of a strong, lightweight plastic filament, with little stretch, such as, for example, KEVLAR aramid fiber.

Based on the foregoing description, it can be seen that the construction of the present invention is more compact than conventional units which perform a similar function, and has very little mass and inertia. Therefore, little motor torque is required to lower and raise the pen, and it can be done very rapidly. Moreover, the various components are readily accessible and thus repair or replacement when necessary is relatively simple.

While illustrative and presently preferred embodiments of the invention have been described in detail herein, it is to be understood that the essential concepts of the invention may be otherwise variously embodied and employed, and that the following appended claims are intended to be construed to include such variations.

What is claimed:

1. Apparatus comprising:
   a carriage and means for supporting said carriage for movement along a first axis;
   marking means for marking a surface;
   support means for supporting said marking means from said carriage for movement with said carriage along said axis and for supporting said marking means for movement transverse to said axis between first and second positions thereof; and
   means for moving said support means so as to move said marking means between said first and second positions without affecting movement of said carriage along said axis, said means for moving comprising:
   a cable;
   first means pivotally supported by said carriage and engaged by said cable so as to pivot upon movement of said cable;
   means coupled to said cable for moving said cable along a path thereof so as to pivot said first means; and
   means for coupling said first means to said support means to move said support means so as to move said marking means between said first and second positions in response to pivoting of said first means.

2. The apparatus for claim 1 wherein said first means comprises a link, a pivot for pivotally supporting said ink on said carriage and a pulley structure engaged by said cable and supported by said link, and wherein said second means comprises a cam arrangement associated with said link and with said support 3. The apparatus of claim 2 wherein said pulley structure comprises a first pulley structure supported on said link on one side of said pivot and a second pulley structure supported on said link on another side of said pivot.

4. The apparatus of claim 3 wherein said first and second pulley structures each comprise first and second pulleys coaxially supported on said link.

5. The apparatus of claim 3 comprising means for maintaining tension in said cable, and wherein said means for moving said cable comprises a drive pulley engaging said cable and a motor connected to rotate said drive pulley, said first and second pulley structures each comprise first and second pulleys supported coaxially on said link, and wherein said cable includes:
- a first portion extending from said drive pulley and engaging a first pulley of the first pulley structure;
- a second portion extending from said first pulley of said first pulley structure and engaging a first pulley on said second pulley structure;
- a third portion extending from said second portion and generally parallel with said first portion and connected to said tension maintaining means, said first, second, and third portions defining a generally Z-shaped configuration;
- said third portion extending from said tension maintaining means and continuing towards said first pulley structure;
- a fourth portion continuing from said third portion and engaging a second pulley of said first pulley structure;
- a fifth portion extending from said fourth portion and engaging a second pulley of said second pulley structure;
- a sixth portion extending from said fifth portion generally parallel to said first portion and connecting with said drive pulley, said fourth, fifth, and sixth portions defining a generally Z-shaped configuration;
- said drive pulley when rotated displacing said first and sixth portions in opposite directions and causing said link to pivot and move said support means.

6. The apparatus of claim 1 comprising means for maintaining tension in said cable.

7. The apparatus of claim 1 wherein said means for moving said cable comprises a drive pulley said cable and a motor connected to rotate said drive pulley.

8. Graphics apparatus for developing plots and/or graphics, comprising:
- a carriage and means for supporting said carriage for movement along a first axis of the apparatus;
- marking means for marking a surface to develop a plot and/or graphics thereon;
- support means for supporting said marking means from said carriage for movement with said carriage along said axis and for supporting said marking means for movement transverse to said axis between a first position for marking the surface and a second position away from the marking surface; and
- means for moving said support means so as to move said marking means between said first and second positions without affecting movement of said carriage along said axis, said means for moving comprising:
- a cable;
- first means pivotally supported by said carriage and engaged by said cable so as to pivot upon movement of said cable;
- means coupled to said cable for moving said cable along a path thereof so as to pivot said first means; and
- means for coupling said first means to said support means to move said support means so as to move said marking means between said first and second positions in response to pivoting of said first means.

9. The apparatus of claim 8 wherein said first means comprises a link, a pivot for pivotally supporting said link on said carriage and a pulley structure engaged by said cable and supported by said link, and wherein said second means comprises a cam arrangement associated with said link and with said support means.

10. The apparatus of claim 9, wherein said pulley structure comprises a first pulley structure supported on said link on one side of said pivot and a second pulley structure supported on said link on another side of said pivot.

11. The apparatus of claim 10 wherein said first and second pulley structures each comprise first and second pulleys coaxially supported on said link.

12. The apparatus of claim 10 comprising means for maintaining tension in said cable, and wherein said means for moving said cable comprises a drive pulley engaging said cable and a motor connected to rotate said drive pulley, said first and second pulley structures each comprise first and second pulleys supported coaxially on said link, and wherein said cable includes:
- a first portion extending from said drive pulley and engaging a first pulley of the first pulley structure;
- a second portion extending from said first pulley of said first pulley structure and engaging a first pulley on said second pulley structure;
- a third portion extending from said second portion and generally parallel with said first portion and connected to said tension maintaining means, said first, second, and third portions defining a generally Z-shaped configuration;
- said third portion extending from said tension maintaining means and continuing towards said first pulley structure;
- a fourth portion continuing from said third portion and engaging a second pulley of said first pulley structure;
- a fifth portion extending form said fourth portion and engaging a second pulley of said second pulley structure;
- a sixth portion extending from said fifth portion generally parallel to said first portion and connecting with said drive pulley, said fourth, fifth, and sixth portions defining a generally Z-shaped configuration;
- said drive pulley when rotated displacing said first and sixth portions in opposite directions and causing said link to pivot and move said support means.

13. The apparatus of claim 8 comprising means for maintaining tension in said cable.

14. The apparatus of claim 8 wherein said means for moving said cable comprises a drive pulley engaging said cable and a motor connected to rotate said drive pulley.

* * * * *

UNITED STATES PATENT AND TRADEMARK OFFICE
CERTIFICATE OF CORRECTION

PATENT NO. : 5,333,005
DATED : July 26, 1994
INVENTOR(S) : John C. Venthem and James A. Parnell It is certified that error appears in the above-indentified patent and that said Letters Patent is hereby corrected as shown below:

Column 8, line 54, (claim 2, line 3) change "ink" to --link--.

Column 8, line 57, (claim 2, line 6) after "support" insert --means.--

Column 9, line 37, (claim 7, line 2) after "pulley" insert --engaging--.

Column 10, line 45, (claim 12, line 24) change "form" to --from--.

Signed and Sealed this

Twenty-seventh Day of December, 1994

Attest:

BRUCE LEHMAN

*Attesting Officer*     *Commissioner of Patents and Trademarks*